United States Patent
Barratt et al.

(10) Patent No.: US 7,227,855 B1
(45) Date of Patent: Jun. 5, 2007

(54) RESOURCE ALLOCATION IN A WIRELESS NETWORK

(75) Inventors: Craig H. Barratt, Redwood City, CA (US); Mitchell D. Trott, Mountain View, CA (US); Christopher R. Uhlik, Danville, CA (US)

(73) Assignee: ArrayComm LLC, San Jose, CA (US)

( * ) Notice: Subject to any disclaimer, the term of this patent is extended or adjusted under 35 U.S.C. 154(b) by 928 days.

(21) Appl. No.: 09/919,683

(22) Filed: Jul. 31, 2001

Related U.S. Application Data

(60) Provisional application No. 60/277,591, filed on Mar. 20, 2001.

(51) Int. Cl.
*H04J 1/00* (2006.01)
*H04J 3/00* (2006.01)

(52) U.S. Cl. .................. 370/343; 370/346; 370/465

(58) Field of Classification Search ............... 370/431, 370/449, 335, 320, 343, 346, 465, 479, 321, 370/330, 336, 480, 481; 375/132, 135, 136
See application file for complete search history.

(56) References Cited

U.S. PATENT DOCUMENTS

| | | | |
|---|---|---|---|
| 4,479,226 A * | 10/1984 | Prabhu et al. ............... 380/34 |
| 4,998,290 A | 3/1991 | Olenick et al. |
| 5,291,475 A * | 3/1994 | Bruckert ..................... 370/330 |
| 5,335,246 A * | 8/1994 | Yokev et al. ............... 375/133 |
| 5,506,863 A * | 4/1996 | Meidan et al. ............. 375/134 |
| 5,682,403 A * | 10/1997 | Tu et al. ..................... 375/220 |
| 5,978,366 A * | 11/1999 | Massingill et al. ......... 370/337 |
| 6,138,019 A | 10/2000 | Trompower et al. |
| 6,181,945 B1 * | 1/2001 | Lee ............................. 340/7.21 |
| 6,208,634 B1 * | 3/2001 | Boulos et al. .............. 370/342 |
| 6,332,075 B1 * | 12/2001 | Verdonk ..................... 455/408 |
| 6,359,924 B1 * | 3/2002 | Kuhn et al. ................. 375/132 |
| 6,389,057 B1 * | 5/2002 | Haartsen .................... 375/132 |
| 6,542,478 B1 * | 4/2003 | Park ........................... 370/308 |
| 6,574,266 B1 * | 6/2003 | Haartsen .................... 375/133 |

(Continued)

FOREIGN PATENT DOCUMENTS

WO     WO 99/08392     2/1999

(Continued)

*Primary Examiner*—Andrew C. Lee
(74) *Attorney, Agent, or Firm*—Blakely Sokoloff Taylor & Zafman; Themi Anagnos

(57) ABSTRACT

A data stream is transmitted between a base station and user terminal. A first resource that is available to transmit a page is selected at the base station and the page transmitted from the base station via the first resource. The page is received at the user terminal via the first resource and a second resource that is available to transmit a page response is selected at the user terminal. A page response is transmitted from the user terminal via the second resource in response to the page. A data stream is then transmitted between the base station and user terminal via a third resource. In one embodiment, the first, second and third resources utilize the same sequence of radio frequency resources that follow a hopping sequence among a set of available radio frequency resources. In one embodiment, at least two of the first, second and third resources utilize the same sequence of radio frequency resources. In yet another embodiment, the resources utilize different sequences of radio frequency resources.

54 Claims, 4 Drawing Sheets

U.S. PATENT DOCUMENTS

| | | | |
|---|---|---|---|
| 6,577,874 B1 * | 6/2003 | Dailey | 455/521 |
| 6,587,498 B1 * | 7/2003 | Sarkola | 375/132 |
| 6,600,920 B1 * | 7/2003 | Stephens et al. | 455/432.1 |
| 6,678,341 B1 * | 1/2004 | Miyake et al. | 375/356 |
| 6,711,151 B1 * | 3/2004 | Ziegler | 370/350 |
| 6,757,318 B1 * | 6/2004 | Ziegler et al. | 375/133 |

FOREIGN PATENT DOCUMENTS

| | | |
|---|---|---|
| WO | WO 99/14897 | 3/1999 |
| WO | WO 99/37106 | 7/1999 |
| WO | WO 00/22858 | 4/2000 |
| WO | WO 03/013078 A1 | 2/2003 |

* cited by examiner

Fig. 2(A) - UT initiates data transfer
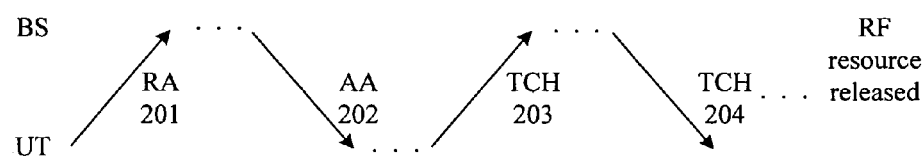
Fig. 2(B) - BS initiates data transfer
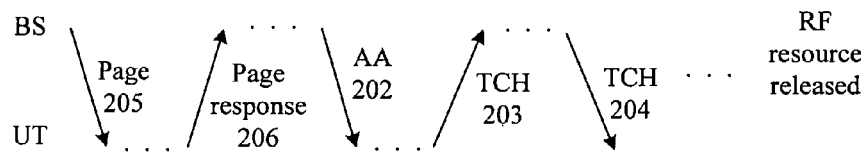

Fig. 3 - PAGE

| | Frame no. → | | | | | | |
|---|---|---|---|---|---|---|---|
| | 0 | 1 | 2 | 3 | 4 | 5 | ... |
| CARRIER A | Page UT1 | | Page UT1 | | Page UT1 | | |
| CARRIER B ⋮ | UT2/ BS TCH | UT2/ BS TCH | UT2/ BS TCH | UT2/ BS TCH | UT2/ BS TCH | UT2/ BS TCH | |

RESOURCE ALLOCATION IN A WIRELESS NETWORK

RELATED APPLICATIONS

This application claims the benefit of provisional application No. 60/277,591, entitled Resource Allocation in a Wireless Network, filed Mar. 20, 2001. This application is related to nonprovisional application Ser. No. 09/919,726, entitled Resource Assignment Through Paging, filed concurrently herewith.

COPYRIGHT NOTICE

Contained herein is material that is subject to copyright protection. The copyright owner has no objection to the facsimile reproduction of the patent disclosure by anyone as it appears in the Patent and Trademark Office patent files or records, but otherwise reserves all rights to the copyright whatsoever.

BACKGROUND OF THE INVENTION

1. Field of the Invention

The invention relates to the field of wireless communication networks. In particular, the invention relates to a process for dynamically allocating resources for transmitting control and/or data messages, as well as for assigning such resources to distributed processing resources in a Base Station (BS) for processing each transmission.

2. Description of the Related Art

Allocating Radio Frequency Resources

Dedicating a particular radio frequency (RF) range as a control channel in a wireless communications network over which to exchange control messages, that, among other things, manage access to and use of traffic channels in the network for data transmission, lacks flexibility and may waste network resources. For example, the control channel must have sufficient bandwidth to carry control messages during peak usage periods in the wireless communications network, resulting in the control channel being underutilized in all but heavy or peak usage periods in the network. Conversely, if traffic demands on the network grow beyond expected peak usage rates, the control channel may, during such times, be over-utilized, resulting in periods during which data transmissions in the wireless communications network may be unnecessarily limited due to the inability to timely allocate RF resources for the data transmission.

Dynamically allocating an RF resource, for example, to transmit control information or user data, in a wireless communications network on an as needed basis, provides better flexibility and offers better utilization of the RF resources in the network. However, if there is no dedicated control channel in the wireless communications network to which a User Terminal (UT) is always tuned to listen for a page from a Base Station (BS), an issue arises as to how the UT or BS set up an RF resource for transmitting messages, whether control or data messages. Thus, the UT first needs to know over what RF resource to transmit a Random Access (RA) request, or over what RF resource to listen for a page from the BS. Furthermore, the UT needs to know over what RF resource to transmit a Page Response in response to the page, in order to set up yet another RF resource over which to exchange data or in-band messages with the BS in the communications network. Since the assignment and allocation of at least one RF resource is required to transmit data, it is advantageous for this dynamic RF resource allocation process to be as efficient as possible. (It should be noted that the term User Terminal, as used herein, refers to a user device or user equipment. Additionally, a user is a device or application attached to the UT, and a subscriber is a person or entity owning or using the user/UT.)

Allocating Base Station Hardware Resources

Efficient allocation and use of RF resources in a wireless communications network is important. However, the importance of efficient utilization of BS resources is also readily apparent. A traditional base station architecture utilizes a central processor to decide which RF resources, as well as BS hardware resources, are available for transmitting data, and sends a page message comprising, for example, a page identifier, of a UT being paged and the location (e.g., radio frequency spectrum) of the available RF resources. An alternative BS architecture is based on a distributed processing architecture that comprises, for example, multiple Digital Signal Processors (DSPs). In such a BS, RF resources are assigned to a particular DSP for transmitting a stream and then released. (A stream is defined herein as a series of RF data bursts, or data packets). It would be desirable for the distributed DSPs to operate independently with respect to each other, otherwise a central processor with signal paths to each DSP is necessary to coordinate operation of the DSPs, with the concomitant processing overhead associated therewith. However, with independent operation of the DSPs, there arises the problem of assigning a particular RF resource to a particular DSP for transmitting a series of RF data bursts. Without the DSPs first exchanging information among each other about their state, e.g., active, idle, etc., the question arises which DSP should be assigned to, and process, the RF resource.

BRIEF DESCRIPTION OF THE SEVERAL VIEWS OF THE DRAWINGS

The invention is illustrated by way of example and not limitation in the following figures. Like references indicate similar elements, in which:

FIG. 2(A) is a timing diagram of a user terminal initiated data exchange with a base station.

FIG. 2(B) is a timing diagram of a base station initiated data exchange between a user terminal and a base station.

FIG. 3 illustrates an example embodiment of the invention.

DETAILED DESCRIPTION OF THE INVENTION

Figure 1:
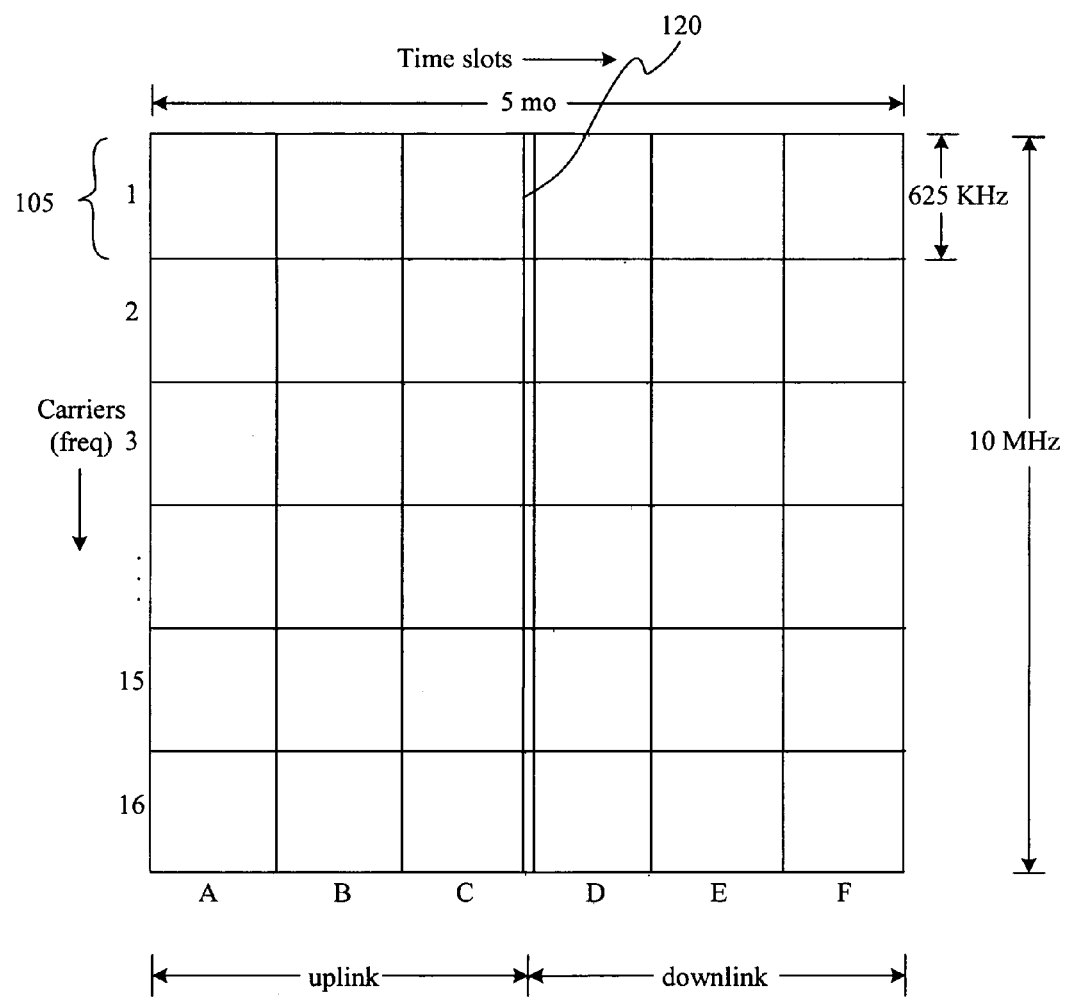
FIG. 1 illustrates multiple frequencies and time slots in a radio frequency spectrum.

The invention relates to a process for dynamically allocating resources, and utilization thereof for transmitting messages, as well as assigning such resources to distributed hardware processing resources, or simply, hardware resources, in a Base Station (BS) for each transmission.

Overview

In one embodiment, the invention is utilized in a wireless communications network operated in accordance with proprietary, well known, or commercially available protocols. One such example of a commercially available protocol is the i-Burst™ Broadband Access system available from ArrayComm Corporation in San Jose, Calif., the assignee of the invention. The i-Burst system provides a user with high-speed, wireless Internet connection for a device of the user's choice (e.g., a laptop, palmtop, Internet appliance, etc.). The i-Burst system utilizes a Time Division Multiple Access/Time Division Duplex (TDMA/TDD) based air interface that is optimized to provide mobile broadband Internet Protocol (IP) access. TDD access provides flexibility in RF resource acquisition and in accommodating asymmetric traffic between uplink transmissions from a UT to a BS and downlink transmissions from the BS to the UT. However, it is appreciated that the invention, as set forth below, can operate or be modified to operate in other wireless communications networks utilizing other protocols, such as the well known Analog Mobile Phone System (AMPS), or Digital-AMPS, to cite just two common examples.

i-Burst is neither a packet switched data system, such as set forth in the IEEE's standard for wireless LANs (IEEE 802.11), in which a radio frequency is provided transmitting a single packet, nor a circuit switched system like Japan's Personal HandyPhone System (PHS), in which a circuit is set up and torn down for multiple packets being transmitted. Rather, i-Burst essentially is a hybrid of packet switched communications and circuit switched communications, in which data is transferred in streams, wherein a stream is a series of zero or more packets. It is appreciated that, for example, in such a system, efficient stream setup and tear down is important to efficiently utilize RF resources.

Whenever a base station (BS) has a packet to send to a user and a stream is not already active with that user, wherein the user is a device or application associated with a User Terminal (UT), the user is notified via a page directed to the UT. Likewise, whenever the user has a packet to transmit to the BS and a stream is not active between the BS and the user, the UT requests to begin a stream with the BS via a random access (RA) request. Once the stream is established, packets may follow immediately after one another until either the user or BS decides to terminate the stream. For example, when the packet queues in both directions are exhausted, the stream normally immediately shuts down.

An i-Burst user terminal registers with a BS to form a relationship referred to as a registration. The registration enables the UT and the BS thereafter to exchange both control messages and data messages. In one application embodying the invention, multiple UTs can each establish a network session to log into an Internet Service Provider (ISP) via a gateway provided by, or accessible to, the BS. Multiple registrations may occur during a single network session, in particular when a UT is mobile and moving among multiple base stations during the single network session.

During a network session, many streams likely occur. During idle periods, that is, when no data packets are being transmitted between a BS and the UT, the UT may periodically listen for pages in the downlink direction from the BS. After a long idle period, the registration between the UT and BS times out and ends.

In more sophisticated UTs, multiple streams can simultaneously be open and transferring packets in parallel, for example, on several time slots. Alternatively, multiple streams can be transferring packets in parallel via several radio frequency channels, also increasing throughput.

Figure 4:
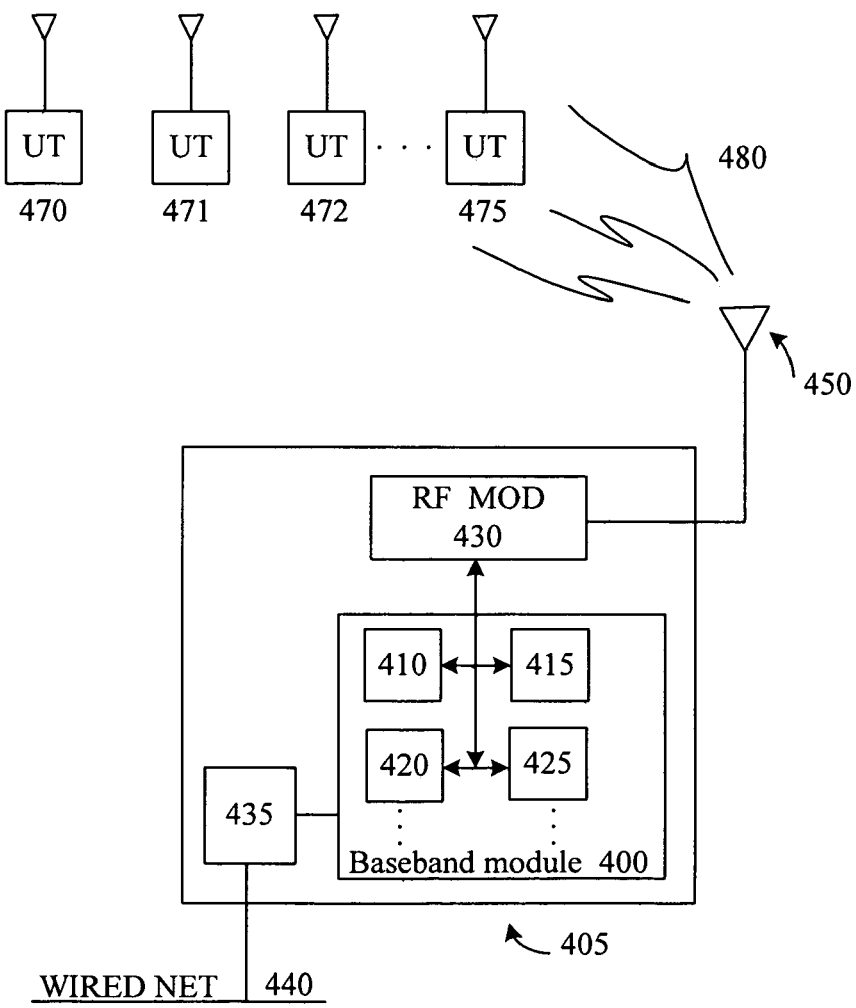
FIG. 4 illustrates an example embodiment of the invention with a base station.

A base station, as may be utilized in an embodiment of the invention, is illustrated in FIG. 4. The base station 405 comprises a baseband module 400, having multiple, distributed computing resources, such as digital signal processors 410–425. In one embodiment, the DSPs are Motorola MC56311 DSPs. Each of the DSPs is coupled to an RF module 430, providing a conversion of digital to analog signals for downlink transmissions, and analog to digital conversion of received uplink signals to digital signals, for processing by at least one of the DSPs. The RF module optionally provides for amplification of analog signals. An antenna array 450 provides for transmitting and receiving control and data messages via an air interface 480 to communicate with user terminals, e.g., UTs 470–475, in the same sector of a wireless communications network as the BS. A network card or network switch 435 provides transmission and/or routing capabilities in association with a wired network, such as an Ethernet network 440 or the Internet. Thus, for example, data may be received via the network card or switch from the Internet and transmitted over the air interface to one or more user terminals.

In one embodiment of the invention, it is contemplated the DSPs operate substantially independently of one another and are each assigned to a particular RF resource in the wireless communications network, whether such RF resource is, for example, an RF carrier, a time slot, a frame, a code in a CDMA system, or some combination thereof. In any case, according to one embodiment of the invention, each DSP is assigned to a particular hopping sequence that follows a sequence of RF resources to be utilized for transmitting data over the wireless communications network.

With reference to FIG. 1, an RF resource, as referred to herein, is a resource in the radio-frequency domain. An RF resource can be a radio frequency (RF) carrier or channel, that is, a portion of radio frequency spectrum, for example, a 625 kHz wide radio frequency channel in one embodiment of the invention. An RF resource can also be a time slot or frame, not necessarily confined or limited to a particular frequency band, although commonly so for regulatory reasons. Alternatively, an RF resource can be a code in a code division multiple access (CDMA) system. Indeed, an RF resource can be a combination of RF carrier, time slot or CDMA code, for example, a combination of RF carrier and time slot or frame, a combination of RF carrier and a CDMA code, or a combination of RF carrier, time slot or frame, and a code in a CDMA system.

A set of RF resources, then, generally can be thought of as an available portion of RF spectrum and time divided into individual pieces that can be isolated at an RF receiver.

FIG. 1 illustrates an RF resource as a frame of some duration, e.g., 5 milliseconds, further subdivided into multiple time slots. FIG. 1 depicts 6 time slots per frame, wherein the first 3 time slots are uplink time slots, and the second 3 time slots are downlink time slots. The first downlink time slot is separated from the last uplink time slot by a transition guard time 120. Alternatively, each time slot may comprise an RF resource.

In the embodiment illustrated in FIG. 1, sixteen 625 kHz RF carriers fit in a nominal 10 MHz wide operating bandwith 6 time slots per frame (A–F), yielding 3 time slot pairs, wherein each pair comprises an uplink time slot and a downlink time slot. It is, of course, appreciated that the operating band, frame duration, time slot duration, time slots per frame, number of uplink versus downlink time slots, etc., may be configured to take in consideration different operating environments, network protocols, and architectures without departing from the invention.

There is furthermore a notion of a base station hardware resource, such as a DSP in one embodiment, being configured to follow a hopping sequence among a set of RF resources. The term resource, when used herein by itself, refers to this sequence of RF resources that follow a hopping sequence. In one embodiment, a hopping sequence can be a radio frequency hopping sequence. Alternatively, a hopping sequence can be a time hopping sequence, or a code hopping sequence. In one embodiment, each base station hardware resource is assigned to a resource, that is, a sequence of RF resources that follow a particular hopping sequence, for example, to participate in transmitting a stream of data with a user terminal via the resource.

Thus, a DSP in the base station processes a particular hopping sequence. Streams start up and remain on a fixed hardware resource, and employ a sequence of RF resources per the hopping sequence associated with the hardware resource. To change to another hardware resource on the same or other BS, a new stream is started and the old stream stopped. In another embodiment of the invention, using spatial processing techniques, multiple resources can exist together on a single hardware resource.

Allocation of Resources for a Stream

With reference to FIG. 2, a stream, or sequence of radio frequency bursts transmitted over a fast circuit switched channel, is illustrated. In FIG. 2(A), a User Terminal (UT) begins a sequence of radio bursts with a random access (RA) request burst 201 in an uplink timeslot to a BS, specifying, in one embodiment, the paging identifier (PID) of the UT. The BS may see this RA request and may respond with an access assignment (AA) burst 202 in the corresponding downlink time slot later in the frame, thereby opening a stream. In one embodiment, the AA informs the UT what resource the UT is to use for the remainder of the stream, if different from the resource already used to send the RA request. In one embodiment, the UT may communicate user data with the BS via the same resource used to exchange the RA and AA, or the AA may indicate the UT and BS exchange user data via a different resource, for example, a traffic channel (TCH) that follows its own hopping sequence, for example, a radio frequency hopping sequence. Thereafter, user data and/or in-band signals messages can be transmitted between the UT and BS, e.g., at 203 and 204, until the stream is terminated.

As illustrated in FIG. 2(B), streams may begin when the BS notifies the UT via a page message 205 on a downlink time slot. The UT knows the page is sent to it based on, for example, the paging identifier (PID) or other unique information in the page identifying the UT as the appropriate recipient of the page. The UT listens for the page by following the hopping sequence utilized by the BS. In one embodiment, the UT and BS maintain predefined hopping sequence information in locally accessible data structures so that the UT knows where (that is, on what RF resource) to listen for a page from the BS.

After receiving the page from the BS, the UT recognizes that it should contact the BS, for example, to receive queued information, and must locate a resource over which to receive the queued information. In one embodiment of the invention, the UT sends a page response 206 on the same resource as utilized by the BS in sending the page. If the UT receives a corresponding AA, the UT has been granted a stream. Alternatively, the UT may utilize a different resource to send the page response 206, and such resource may follow a different hopping sequence than the resource over which the page from the BS was transmitted.

As noted above, the UT responds with the page response 206 on the same or different resource, depending on the embodiment of the invention. In the event the page response is transmitted to the BS via a different resource, the BS and UT agree beforehand on the resource and respective hopping sequence followed by the resource over which to send the page response. This may be accomplished through the exchange of information that coordinates the page and page response communications between the BS and UT, for example, during registration and configuration of these devices.

The page response is thus to the same base station hardware resource on the corresponding uplink time slot in the very next frame (since BS DSPs are assigned a particular time slot, in one embodiment of the invention). Moreover, the base station hardware resource that sent the page is known to be free because it had the transmit resources to construct and transmit the page. In this manner, hardware resource assignment is provided, in one embodiment of the invention, through paging.

The quicker the UT responds to the page, the greater likelihood the same resource utilized by the page will still be available, if indeed the UT intends to utilize the same resource. If the UT sends the page response on the same resource as the page, but does not receive the AA in response thereto, the UT falls back to the random access process described above with respect to FIG. 2(A), otherwise the remainder of the messages are exchanged as described above with respect to FIG. 2(A).

In this manner, paging is accomplished without a dedicated control channel. All unused hardware resources are available for paging. Whenever a base station hardware resource is idle, it builds pages for any users that are expected to be listening on the resource over which the page is transmitted and for whom data is queued and waiting. Thus, paging operates to provide a resource allocation strategy.

In one embodiment, each UT has a unique radio frequency and time slot hopping sequence that it monitors while in the idle state. The UT hops to different RF resources listening for a page from different BS hardware resources. The sequence of RF resources followed by the UT is referred to as the UT's paging resource. The page includes the UT's paging identifier (PID) or some other such unique information. Likewise, the hardware resources at the BS each maintain a list of UTs (PIDs) that it can page at each hop. When the BS receives a data packet, e.g., from the Internet, destined to a UT, the base station hardware resource that is matched to the paging resource at that frame sends a page. In one embodiment, paging is repeated, one page per frame, until the UT responds or times out. The UT may listen for a page one time slot per frame, or one time slot per multiple frames. It is appreciated that to decrease the number of RF or hardware resources and to conserve UT battery, the frequency of paging can be decreased.

The BS knows what page listening pattern the UT is following by computing a function at the BS that tracks the UT page listening pattern. For example, the BS can identify the page listening pattern of the UT by referring to a look up table or the like maintained in the BS for the UT. Likewise, the UT computes a function at the UT to determine the resource over which to send a page response. For example, the UT searches a look up table maintained at the UT when it receives a page to determine over what resource to send a page response. In this manner, the BS and the UT are able follow each other along. This aspect of the invention allows for resource assignment. In particular, if a BS does not want a particular UT to send a page response on a particular resource, the BS simply avoids sending a page to the UT on the corresponding resource.

The paging process described above makes implicit resource allocation or assignment possible by providing information about available resources to the user terminals. Pages are only sent from, and thus seen on, available resources, so a UT responds to pages on a resource where the UT has just received a page, or on a different resource as directed by, for example, the look up table maintained at or accessible by the UT. The fact that the resource is available is either implicit in the timing of the page, or the mapping of the frame in which the page is transmitted to the hopping sequence information calculated at the BS and UT. Thus, there is no need for explicit information in the page that indicates the resource is free, which helps keep the page short and simple, reducing processing overhead in the allocated RF spectrum. This aspect of the invention greatly increases the likelihood that the first attempt by the UT to respond to a page on a particular resource will likely be on an available resource.

If the first attempt to send the page response fails, for example, if some other UT or BS grabs the resource just before the UT attempts to send a page response, the UT recognizes that it must still contact the BS. In one embodiment, the UT attempts to retry sending a page response some number of times before scanning for other resources over which to send a page response to the BS. Additionally, the number of retries can be parameterized and provide for different levels of service based thereon.

The BS assigns resources by sending or withholding pages. Moreover, it can also assign hardware resources to provide a DSP associated with a time slot (or radio frequency) that has free processing cycles available to process a page. Importantly, the DSP does not need to know the state of the BS or other DSPs. The DSP only needs to be concerned with whether it has the computing resources to provide a page and/or receive a page response, and indicate to a general processor in the BS to stop the paging process once it has done so. In this manner, direct DSP to DSP communication in the BS is eliminated, yet transmission of paging and data messages is shared.

For purposes of illustration, a simplified example of an embodiment of the invention is provided below, with reference to FIG. 3. The example presumes a single BS having just two hardware resources, e.g., DSPs, and a radio frequency spectrum having just two RF resources, radio frequency A and radio frequency B. Additionally, only two UTs are located in the same sector as the BS, UT1 and UT2.

Guidelines are established and agreed upon by the BS and the UTs as follows. UT1 listens for a page on radio frequency A during even numbered frames, and on radio frequency B during odd numbered frames. UT2, conversely, listens for a page on radio frequency B during even numbered frames, and on radio frequency A during odd numbered frames (even though it is appreciated that both UTs could listen to the same radio frequency since there is an address, a PID, or the like, in the page that distinguishes between multiple UTs).

Assume further for this example that UT2 is exchanging data with the BS on radio frequency B, and the radio frequency is busy and thus unavailable, as is the associated BS hardware resource assigned to this radio frequency, while UT2 is exchanging data. While UT2 is exchanging data with the BS on radio frequency B, a message is queued at the BS for UT1. For example, the BS provides or is accessible by a gateway to the Internet and the user associated with UT1 requested some time ago information to be downloaded from a web site on the World Wide Web, and the first of multiple packets to be transmitted to UT1 as a result thereof is queued for transmission to UT1.

The BS, in particular, for example, a general processor in the BS, notifies all DSPs in the BS (in this case, just DSPs A and B) to page UT1. If the DSPs are idle, or based on other criteria such as the load on the RF resource over which a DSP is communicating, the DSPs send a page as follows. Given that DSP B is considered busy in this example communicating with UT2 on radio frequency B, it does not page UT1. However, since DSP A is idle, on an even numbered frame, DSP A sends a page message to UT1 on radio frequency A.

It may be necessary to send multiple pages before UT1 receives and responds to the page. However, on the next frame, an odd numbered frame, DSP A sits idle, since the BS and UT1 agreed that UT1 listens for a page from DSP B on radio frequency B during odd numbered frames, and DSP B is considered busy in this example. Thus, UT1 does not receive a page during the odd numbered frame.

During the next frame, an even numbered frame, UT1 listens for a page on radio frequency A and receives a page, recognizes its own unique identifying information in the page, and verifies integrity of the page. In response thereto, UT1 sends a response page on radio frequency A, specifying, for example, its identifier and transmission power level, etc. While this embodiment utilizes the same radio frequency for the page and page response, it is appreciated that the page response may be transmitted on another radio frequency, or resource, through the use of coordinated look up tables on, or dynamic calculations performed by, the BS and UT.

At this point, DSP A receives the page response and sends an access assignment (AA) on radio frequency A to UT1 directing UT1 to continue utilizing radio frequency A for transmitting data messages. It is further appreciated that the AA may, in another embodiment, indicate a resource, or frequency other than radio frequency A, over which UT1 and DSP A begin transmitting data messages.

This simplified example describes a single BS and only 2 UTs, but an embodiment of the invention functions, and in fact is intended to function, in such a manner that all resources may be shared across multiple BSs in a network without radio frequency reuse problems.

In the description above, for the purposes of explanation, numerous specific details are set forth in order to provide a thorough understanding of the invention. It will be apparent, however, to one skilled in the art that the invention may be practiced without some of these specific details. In other instances, well-known structures and devices are shown in block diagram form.

The invention comprises various steps. The steps of the invention may be performed by hardware components, such as those illustrated herein, or may be embodied in machine-executable instructions, which may be used to cause one or more general-purpose or special-purpose processor or logic circuits programmed with the instructions to perform the steps. Alternatively, the steps may be performed by a combination of hardware and software.

The invention may be provided as a computer program product that may include a machine-readable medium having stored thereon instructions which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier, or radio frequency, wave or other propagation medium via a communication link (e.g., a modem or network connection).

Importantly, the invention can be applied to a wide variety of different wireless systems in which data are exchanged. Such systems include voice, video, music, broadcast and other types of data systems without external connections. The invention can be applied to fixed remote terminals as well as to low and high mobility terminals. Many of the methods are described in their most basic form but steps can be added to or deleted from any of the methods and information can be added or subtracted from any of the described messages without departing from the basic scope of the invention. It will be apparent to those skilled in the art that many further modifications and adaptations can be made. The particular embodiments are not provided to limit the invention but to illustrate it. The scope of the invention is not to be determined by the specific examples provided above but only by the claims below.

What is claimed is:

1. A method for transmitting a data stream between a base station and user terminal comprising:
    selecting at the base station a first of multiple radio frequency (RF) resources to transmit a page;
    transmitting the page from the base station via the first RF resource;
    receiving the page at the user terminal via the first RF resource;
    selecting at the user terminal one of multiple hopping sequence resources to transmit a page response, including computing a function at the user terminal to determine the hopping sequence resource to select, the selected hopping sequence resource comprising a sequence of radio frequency resources that follow a hopping sequence;
    transmitting the page response from the user terminal via the selected hopping sequence resource in response to the page; and
    transmitting the data stream between the base station and user terminal via a second RF resource.

2. The method of claim 1, wherein the first RF resource comprises a first RF resource that is available.

3. The method of claim 2, wherein the selected hopping sequence resource comprises a resource that is available.

4. The method of claim 1, wherein the selected hopping sequence resource comprises a sequence of radio frequency resources that follow a hopping sequence among a set of radio frequency channels.

5. The method of claim 1, wherein the selected hopping sequence resource comprises a sequence of radio frequency resources that follow a hopping sequence among a set of time slots.

6. The method of claim 1, wherein the selected hopping sequence resource comprises a sequence of radio frequency resources that follow a hopping sequence among a set of code division multiple access codes.

7. The method of claim 1, wherein computing a function at the user terminal for the hopping sequence resource to select comprises searching a look up table at the user terminal for the hopping sequence resource to select.

8. The method of claim 1, wherein computing a function at the user terminal for the hopping sequence resource to select includes searching a look up table using information from the page to perform the search.

9. The method of claim 7, wherein searching a look up table comprises using information from the page to perform the search.

10. The method of claim 1, wherein computing a function at the user terminal for the hopping sequence resource to select includes searching a look up table using information implicit in at least one of the page and the first RF resource.

11. The method of claim 7, wherein searching a look up table comprises using information implicit in at least one of the page and the first resource.

12. The method of claim 1, wherein transmitting the page from a base station via the first RF resource comprises transmitting the page including page identifier assigned to the user terminal from the base station via the first RF resource.

13. The method of claim 12, wherein receiving the page at the user terminal via the first RF resource further comprises examining whether the page identifier in the page matches the page identifier assigned to the user terminal.

14. The method of claim 13, wherein transmitting the page response from the user terminal via the selected hopping sequence resource in response to the page comprises transmitting the page selected hopping sequence response from the user terminal via the resource in response to the page if the page identifier in the page matches the page identifier assigned to the user terminal.

15. The method of claim 1, further comprising transmitting a message from the base station acknowledging the page response.

16. The method of claim 15, the message identifying the second RF resource for transmitting a data stream between the base station and user terminal.

17. A method for transmitting a data stream comprising:
    computing a function at a base station to determine a page listening pattern followed by a user terminal;
    selecting at the base station one of multiple radio frequency (RF) resources to transmit a page, based at least in part on the computed function;
    transmitting the page from the base station via the RF resource;
    receiving a page response from the user terminal via a first of multiple hopping sequence resources in response to the page, the first hopping sequence resource comprising a sequence of radio frequency resources that follow a hopping sequence;
    transmitting a message from the base station acknowledging the page response.

18. The method of claim 17, the message identifying a second resource for transmitting a data stream between the base station and the user terminal.

19. The method of claim 18, the second resource comprising a sequence of radio frequency resources that follow a hopping sequence.

20. The method of claim 19, further comprising transmitting the data stream to the user terminal via the second hopping sequence resource.

21. The method of claim 20, wherein the RF resource comprises a RF resource that is available.

22. The method of claim 19, wherein the second hopping sequence resource comprises the same sequence of radio frequency resources that follow a hopping sequence as the first hopping sequence resource.

23. The method of claim 19, wherein the second hopping sequence resource comprises a sequence of radio frequency resources that follow a different hopping sequence than the first hopping sequence resource.

24. The method of claim 17, wherein transmitting the page from the base station via the RF resource comprises transmitting the page including page identifier assigned to the user terminal from the base station via the RF resource.

25. The method of claim 17, wherein the sequence of radio frequency resources follow a hopping sequence among one of a set of radio frequency channels, a set of time slots, and a set of code division multiple access codes.

26. A method for transmitting a data stream comprising:
receiving a page from a base station at a user terminal via a radio frequency resource, the radio frequency resource selected by the base station from among multiple radio frequency resources;
selecting at the user terminal a first hopping sequence resource to transmit a page response, the first hopping sequence resource comprising a sequence of radio frequency resources that follow a hopping sequence, selecting the first hopping sequence resource including computing a function at the user terminal for the first hopping sequence resource to select;
transmitting the page response from the user terminal via the first hopping sequence resource in response to the page; and
receiving a message from the base station acknowledging the page response.

27. The method of claim 26, the message identifying a second hopping sequence resource for transmitting a data stream between the base station and a user terminal, the second hopping sequence resource comprising a sequence of radio frequency resources that follow a hopping sequence.

28. The method of claim 27, further comprising transmitting the data stream to the base station via the second hopping sequence resource.

29. The method of claim 26, wherein the sequence of radio frequency resources follow a hopping sequence among one of a set of radio frequency channels, a set of time slots, and a set of code division multiple access codes.

30. The method of claim 26, wherein the first hopping sequence resource comprises a first hopping sequence resource that is available.

31. The method of claim 26, wherein the second hopping sequence resource comprises the same sequence of radio frequency resources that follow a hopping sequence as the first hopping sequence resource.

32. The method of claim 26, wherein the second hopping sequence resource comprises a sequence of radio frequency resources that follow a different hopping sequence than the first hopping sequence resource.

33. The method of claim 26, wherein computing a function at the user terminal for the first hopping sequence resource to select comprises searching a look up table at the user terminal for the first hopping sequence resource to select.

34. The method of claim 26, wherein computing a function at the user terminal for the first hopping sequence resource to select includes searching a look up table using information from the page to perform the search.

35. The method of claim 26, wherein receiving a page from a base station at a user terminal via a RF resource includes receiving a page identifier.

36. The method of claim 35, wherein receiving the page at the user terminal via the RF resource further comprises examining whether the page identifier in the page matches the page identifier assigned to the user terminal.

37. The method of claim 36, wherein transmitting the page response from the user terminal via the first hopping sequence resource in response to the page comprises transmitting the page response from the user terminal via the first hopping sequence resource in response to the page if the page identifier in the page matches the page identifier assigned to the user terminal.

38. An article of manufacture, comprising:
a computer readable medium providing instructions, that when executed by a machine, cause the machine to:
compute a function to determine a page listening pattern followed by a user terminal;
select a radio frequency resource to transmit a page including a page identifier assigned to a user terminal, the radio frequency resource selected based at least in part on the computed function;
receive a page response via a resource in response to the page;
transmit a message acknowledging the page response, the message identifying a second resource for transmitting a data stream; and
transmit the data stream via the second resource;
wherein one of the first and second resources comprises a sequence of radio frequency resources that follow a hopping sequence.

39. The article of manufacture of claim 38, wherein the one of the first and second resources that comprises a sequence of radio frequency resources that follow a hopping sequence, comprises a sequence of radio frequency resources that follow a hopping sequence among one of a set of radio frequency channels, a set of time slots, and a set of code division multiple access codes.

40. The article of manufacture of claim 38, wherein the instructions, that when executed by a machine, cause the machine to select a first resource to transmit a page, comprise instructions, that when executed by the machine, cause the machine to select a first resource that is available to transmit a page.

41. An article of manufacture, comprising:
a computer readable medium providing instructions, that when executed by a machine, cause the machine to:
receive a page via a radio frequency resource, the radio frequency resource selected by the base station from among multiple radio frequency resources;
select a first resource to transmit a page response, including computing a function to determine the first resource to select, the first resource being one of multiple hopping sequences resources having a sequence of radio frequency resources that follow a hopping sequence;
transmit the page response via the first resource in response to the page;
receive a message acknowledging the page response, the message identifying a second resource for transmitting a data stream; and
transmit the data stream via the second resource.

42. The article of manufacture of claim 41, wherein the first resource having the sequence of radio frequency resources that follow a hopping sequence, comprises a sequence of radio frequency resources that follow a hopping sequence among one of a set of radio frequency channels, a set of time slots, and a set of code division multiple access codes.

43. The article of manufacture of claim 41, wherein the instructions, that when executed by the machine, cause the machine to select a first resource to transmit a page response comprises a first resource that is available to transmit a page response.

44. The article of manufacture of claim 41, wherein the instructions, that when executed by the machine, cause the machine to compute a function for the first resource to select comprises instructions, that when executed by the machine, cause the machine to search a look up table for the first resource to select.

45. The article of manufacture of claim 41, wherein the instructions, that when executed by the machine, cause the machine to compute a function for the first resource to select comprises instructions, that when executed by the machine, cause the machine to search a look up table using information from the page to perform the search.

46. The article of manufacture of claim 45, wherein the instructions, that when executed by the machine, cause the machine to receive the page via the RF resource further comprises instructions, that when executed by the machine, cause the machine to receive a page including a page identifier and examine whether the page identifier in the page matches the page identifier assigned to the machine.

47. The article of manufacture of claim 46, wherein the instructions, that when executed by the machine, cause the machine to transmit the page response via the first resource in response to the page comprises instructions, that when executed by the machine, cause the machine to transmit the page response via the first resource in response to the page if the page identifier in the page matches the page identifier assigned to the machine.

48. A method of communicating with a user terminal, comprising:
    computing a function at a base station to determine a page listening pattern followed by a user terminal;
    transmitting a page to the user terminal on one of multiple parallel communication resources on the base station, the one parallel communication resource selected based on a result of the function computed;
    receiving a page response from the user terminal at the base station, the page response received on one of the multiple parallel communication resources, the communication resource a sequence of radio frequency resource hops; and
    initiating a communication stream on an available communication resource.

49. The method of claim 48, wherein transmitting on one of the multiple parallel communication resources comprises transmitting on one of multiple hardware processing resources.

50. The method of claim 49, wherein each hardware processing resource controls a spatial communication channel.

51. The method of claim 49, wherein initiating the communication stream on the available communication resource comprises the base station initiating the communication stream on one of the hardware processing resources.

52. The method of claim 51, wherein initiating the communication stream on the one hardware processing resource comprises a receiving hardware processing resource initiating the communication stream on a communication resource controlled by the hardware processing resource, independent of the other hardware processing resources.

53. The method of claim 48, wherein receiving the page response on the communication resource comprises receiving the page response on one of multiple hopping sequences present on the base station.

54. The method of claim 53, wherein receiving the page response on the one hopping sequence comprises receiving the page response on a hopping sequence indicated by the base station to the user terminal.

* * * * *